United States Patent
O'Neil

(10) Patent No.: US 8,777,556 B2
(45) Date of Patent: Jul. 15, 2014

(54) CALIFORNIA WIND ENGINE

(76) Inventor: John Lee O'Neil, Burbank, CA (US)

(*) Notice: Subject to any disclaimer, the term of this patent is extended or adjusted under 35 U.S.C. 154(b) by 1111 days.

(21) Appl. No.: 12/655,865

(22) Filed: Mar. 19, 2010

(65) Prior Publication Data

US 2010/0329841 A1 Dec. 30, 2010

Related U.S. Application Data

(60) Provisional application No. 61/205,324, filed on Jan. 21, 2009.

(51) Int. Cl.
*F03B 15/06* (2006.01)
*F03D 7/00* (2006.01)

(52) U.S. Cl.
USPC .............. 415/4.1; 415/8; 415/147; 415/905

(58) Field of Classification Search
USPC ............. 415/3.1, 4.2, 4.4, 191, 203, 211.1, 8, 415/17, 30, 43, 118, 124.1, 146, 147, 149.3, 415/905, 4.1; 416/197 A, 9, 13, 23, 30, 37, 416/39, 40, 41, 61
See application file for complete search history.

(56) References Cited

U.S. PATENT DOCUMENTS

| | | | | |
|---|---|---|---|---|
| 4,084,918 A * | 4/1978 | Pavlecka | ............................ | 415/1 |
| 4,467,960 A * | 8/1984 | Doyle, Jr. | ........................ | 237/55 |
| 5,009,569 A * | 4/1991 | Hector et al. | .................. | 415/4.1 |
| 6,158,953 A * | 12/2000 | Lamont | .......................... | 415/4.4 |
| 7,112,034 B2 * | 9/2006 | Bezemer | ........................ | 415/3.1 |
| 7,317,261 B2 * | 1/2008 | Rolt | ................................ | 290/55 |
| 7,713,020 B2 * | 5/2010 | Davidson et al. | ................. | 415/1 |
| 8,154,145 B2 * | 4/2012 | Krauss | ............................ | 290/54 |

* cited by examiner

*Primary Examiner* — Edward Look
*Assistant Examiner* — Christopher J Hargitt

(57) ABSTRACT

The CWE Concepts are designed to extract the maximum possible wind energy passing through a given square footage area of influencing machine interface at given calculated velocities, to deliver that energy to two power take off shafts for end user's useful work (electrical power generation and other requirements). A multi-bucket "S" rotor, airfoils, baffles and cowling combined, utilize one hundred percent of that moving air volume most efficiently. Our strategies are to use smaller units, yielding more power than existing designs while being installed at much lower levels, urban friendly, less visible, nearly-enclosed rotating machinery, quieter, and safer for indigenous wildlife populations. We plan to market for commercial and residential customers, in turn providing HVAC and electrical power augmentation to utility companies—a reliable and robust addition to the national power grid. Our goals—reduce dependency on foreign oil and provide a clean alternative.

10 Claims, 12 Drawing Sheets

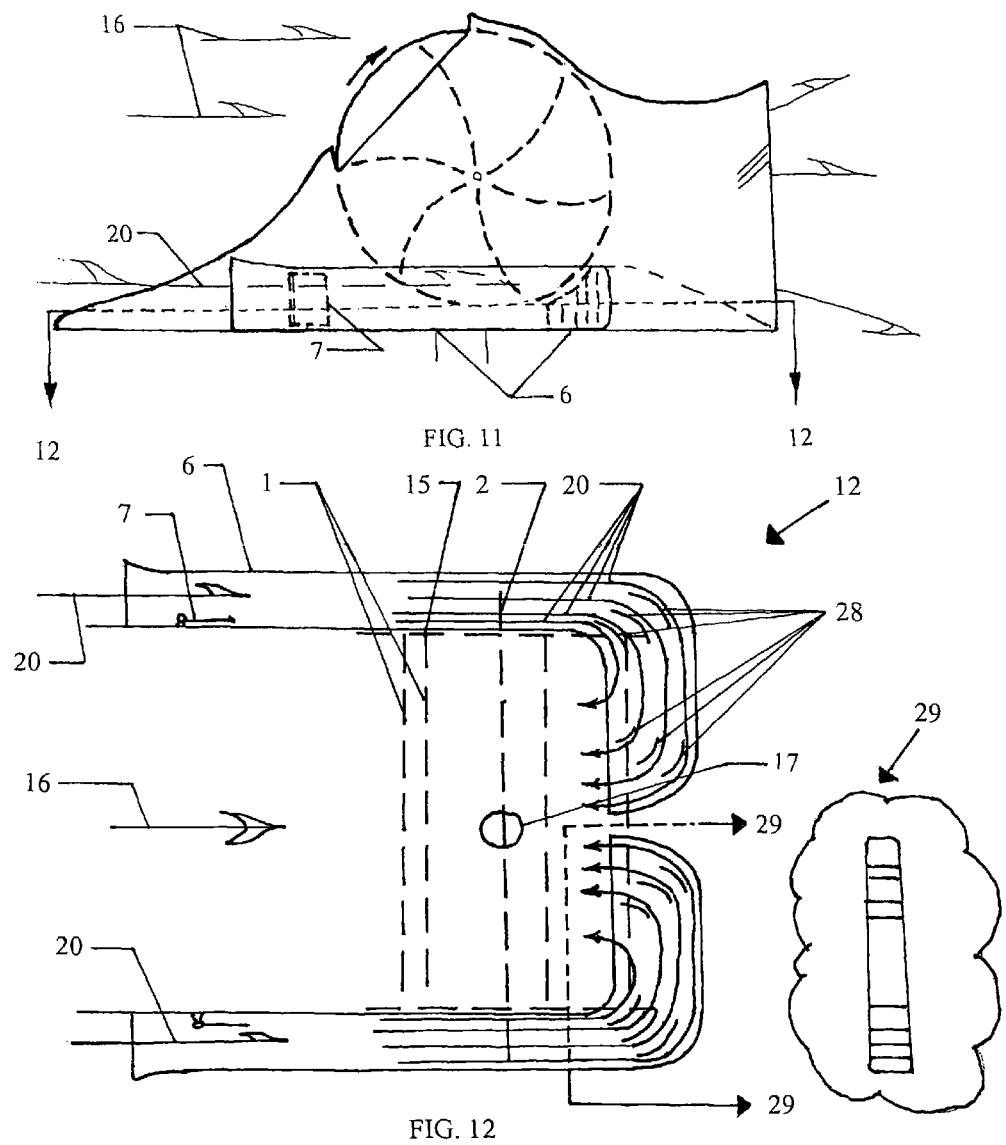

CALIFORNIA WIND ENGINE

This application claims the benefit of U.S. Provisional Application Ser. No. 61/205,324, filed on Jan. 21, 2009, entitled "Whirlwind dynamo; a wind turbine unit designed for purpose of capturing wind energy for useful work. Nine concepts for patent: 1 spill plates, 2 wind ramp, 3 wind keeper cowl, 4 unit cowling enclosure, 5 wind reversal ducts, 6 gust sensor, 7 anti-icing, 8 maintenance rotor brakes, 9 speed governor".

BACKGROUND OF THE INVENTION

The present invention relates generally to "Green" renewable wind energy capture to be used for useful work. The California Wind Engine "S" Rotor system units are designed to enhance the capture of wind energy much more efficiently and reliably while presenting a reduced public perception of unsatisfactory sight visibility interruption both urban and rural. The invention finds application in rural Wind Farm placements, high-rise and commercial building electrical and other power augmentation installations as well as residential and ranch/farm unit installations.

More particularly, the present invention relates to great potential for urban-friendly placements whereby civil urban and rural planning departments will have a much easier task in reviewing and attaining approval consideration for satisfying the general public's needs and aesthetic desires of such wind-driven applications. Current wind energy capture devices tend to garner adverse public acceptance when considering noise pollution, eye disturbance, and hazards to indigenous bird, bat and wildlife populations.

Therefore, the need exists for increasing safety for wildlife, the public in general, reduced horizon interruption, reduced noise pollution and greatly reduced visible rotation components. The need exists for installations placed at much lower elevations, units that are far more capable of power generation when compared with similar-sized wind "sweep" areas of current wind energy capture designs and concepts. Pleasant public acceptance and the potential for mass production and marketing of the present invention lend credence to the concept of economies of scale while reducing the dependence on foreign oil for our nation.

SUMMARY OF THE INVENTION

The present invention provides physical features, shapes and material considerations of the California Wind Engine elements that are within the ordinary skill of those skilled in the art and includes end-user's needs and potential geographical requirements (as in inclement weather climes). The goals include robust, reliable year-round performance of the units to be more efficient, lower visibility, quieter and safer for the wildlife population while benefiting the environment.

Specific considerations of the present invention include the following elements. Best ratio of rotor diameter to rotor chassis width and an airfoil shape, length and degree of the leading edge wind ramp will be discussed. Venturi-effect design and number of degrees of rotor rotation of the downwind opening for wind pressure relief of "used wind exhaust" flow, size, length, shape and placement of the Wind Reversal Ducting System and the size, shape and leverage position of the weather vane rudders and fins. The upwind gust detection system, over-speed governor, variable air volume vanes and wind ramp dump panels as well as anti-icing systems are a part of these specific considerations.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 11 is an elevation side-view of the main body chassis depicting the wind reversal ducting system installation, advising of cross-section taken along line 12-12 in FIG. 12 and intended flow response of the prevailing wind.

FIG. 12 is a cross-section view in plan of the wind reversal ducting system taken along line 12-12 in FIG. 11 and the intended flow response of the prevailing wind. Note cross-section taken along line 29-29 of this FIG. 12 depicting relief of reversed captured wind energy into the lower unit cowling enclosure cavity.

DETAILED DESCRIPTION OF THE PREFERRED EMBODIMENTS

Figure 1:
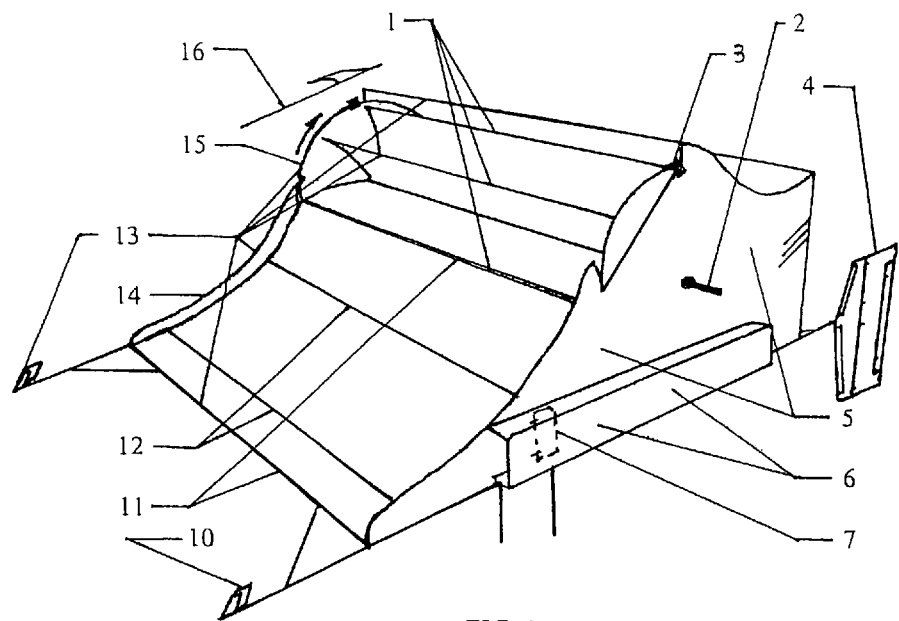
FIG. 1 is a diagram depicting a front quartering isometric view of the inventive wind energy capture device.
Figure 2:
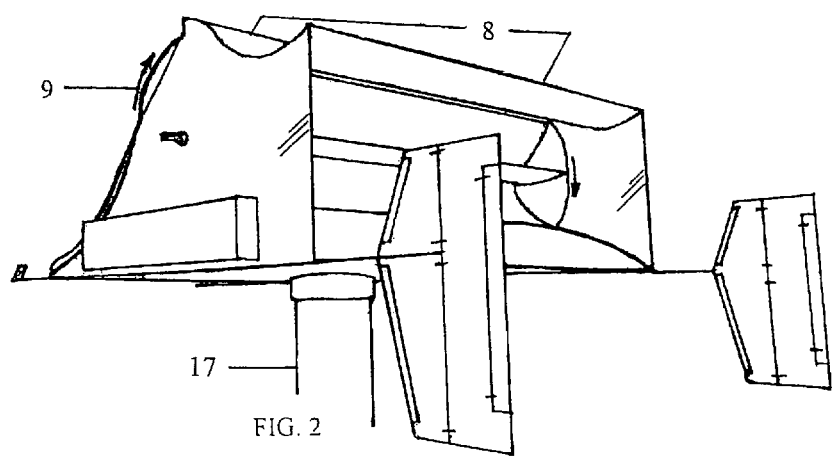
FIG. 2 is a diagram depicting a rear quartering isometric view of the inventive wind energy capture device.
Figure 3:
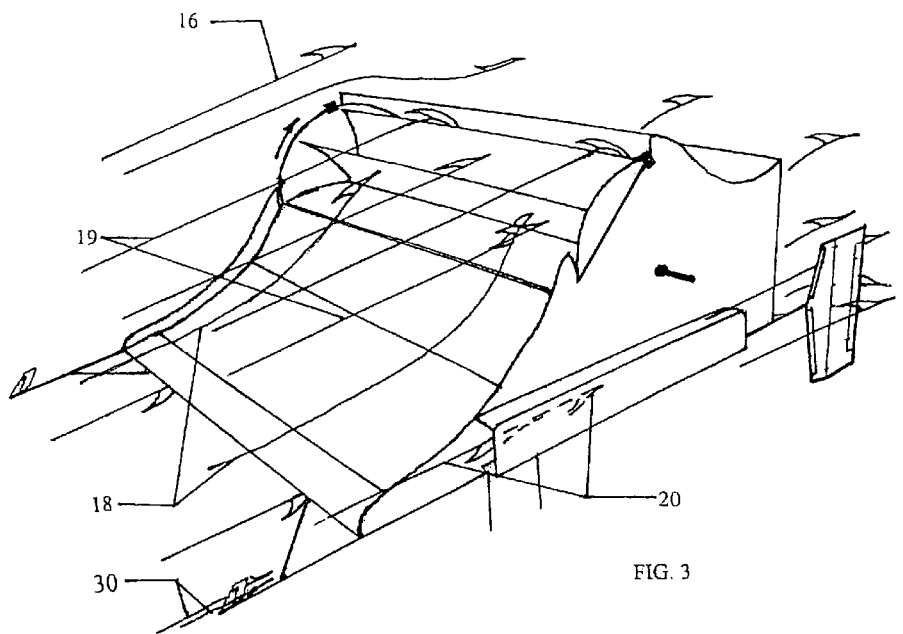
FIG. 3 is a diagram depicting the intended wind energy flow through, and around the device as viewed in the frontal isometric.
Figure 4:
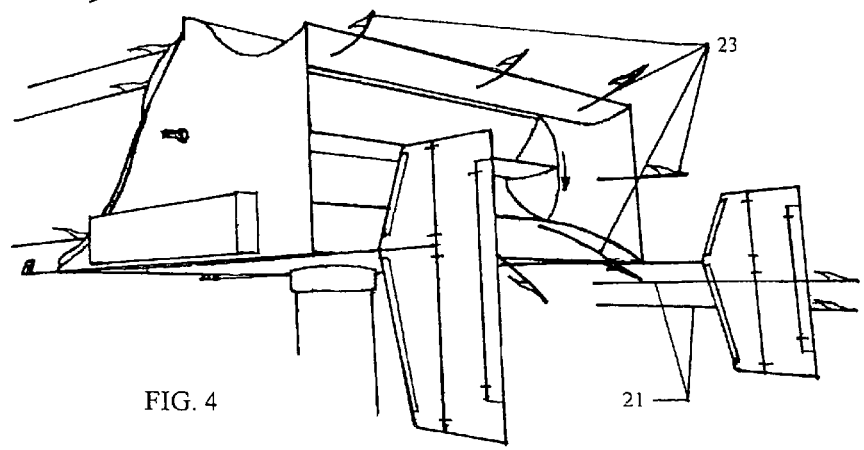
FIG. 4 is a diagram depicting the intended wind energy flow through, and around the device as viewed from the rear isometric.

In FIGS. 1 through 19, the CWE System presents a means of maximizing the efficiency of horizontal and vertical "S" Rotor wind turbines 5 deployed for the purpose of capturing wind energy 16, 18, 19, 20, 21, 23, & 30 for mechanical and electrical power production. The system employs various unique ducting and cowling enclosure designs which foil and redirect relative oncoming wind flow 16, to permit the wind rotor turbine to exhibit positive rotational wind pressure through about three hundred degrees of rotation. The used wind exhaust 23 flows out of the unit downwind of the unit chassis 5 most efficiently via a convergent/divergent Bernoulli-Venturi design set of baffles and cowling enclosures (FIG. 1 & FIG. 2). The exhaust opening radius permitting relief and escape of used wind 23 is approximately 60 degrees to allow that used wind to exhaust. A single barrel horizontal rotor assembly 1 is utilized for this CWE Description. The complete ducting, cowling and related systems and structure consists of nine (9) unique Concept Elements as follows: (See FIG. 1 & FIG. 2)

1. Spill Plates (Splates) 15: solid circular plates affixed at each end of the rotor assembly to prevent captured, compressed wind inside the turbine bucket voids 1 from spilling out of the sides under Load conditions.
2. Wedge-shape curved Wind Ramp 11: Airfoil designed Wind Ramp installed at the bottom half of front of the rotor Chassis 5 leading edge.
3. Wind Keeper Cowling Baffle 8 located across the top of the Wind Engine Chassis 5, curving around the rotor bucket circumference 15 downwind, toward the backside of the Chassis 15 to seal rotor bucket voids a limited number of degrees of clockwise 9 rotation past the 12:00 o'clock position.
4. Cowling Enclosure concept 5: Encloses the rotor assembly with designed side enclosures, Wind Keeper Baffle 8 top enclosure and flat sheet bottom enclosure full length of the CWE main body Chassis 5.
5. Wind Reversal Ducting System (WRDS) 6 linear ducts are mounted on both sides of lower Chassis 5 externally, allowing wind to flow internally, to reverse flow into the upwind bucket voids 1 to cancel backdraft effect.
6. Weather Vane System 4, 10: Small Servotabs 10 hinged to fins mounted on booms extend forward to detect approaching wind direction 16. Large Rudders 4 are hinged to vertical Fins on booms extending downwind of the main unit Chassis 5. Upwind Gusts detected by the Servotabs 10 control the Anti-Servotabs 4, which move the Rudders 4 to accentuate weather vaning for moving the Chassis body 5 continuously toward best wind reception 16.
7. Aircraft-style Anti-Icing 13 prevent ice formation in cold weather.
8. Wind Ramp 11, 12 and WRDS Neutralizing system incorporated to slow the rotor rotation 9, and with Brakes 3 to lock rotor 1 for maintenance and safety.
9. Governor system (not shown in FIGURES) for controlling maximum rotor rotation 9 and protect the CWE from over speeding past structural limits.

CWE final configuration regarding number of bucket blades 1 and design may be varied for best efficiency. Configuration as shown to be considered, but CWE does not specify the six bucket "S" blades as a requirement of the CWE patent Design.

CWE Concept Element #1

Figure 5:
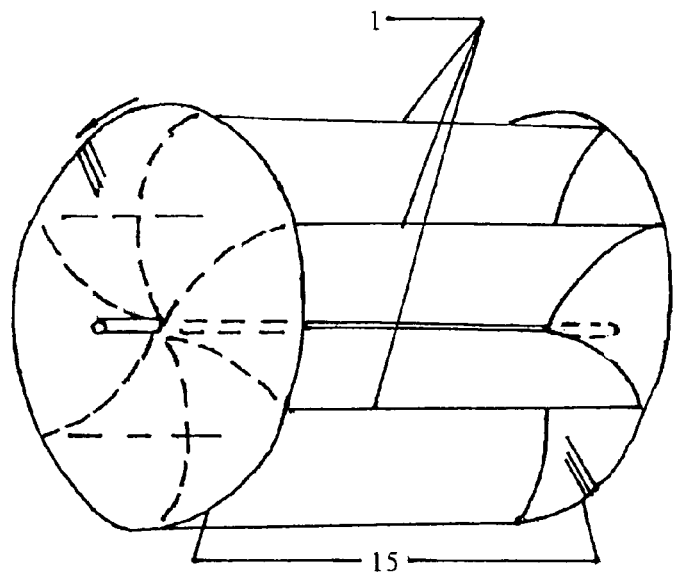
FIG. 5 is a quartering view of the "S" Rotor barrel, with enclosing rotor bucket radial end-plates.
Figure 6:
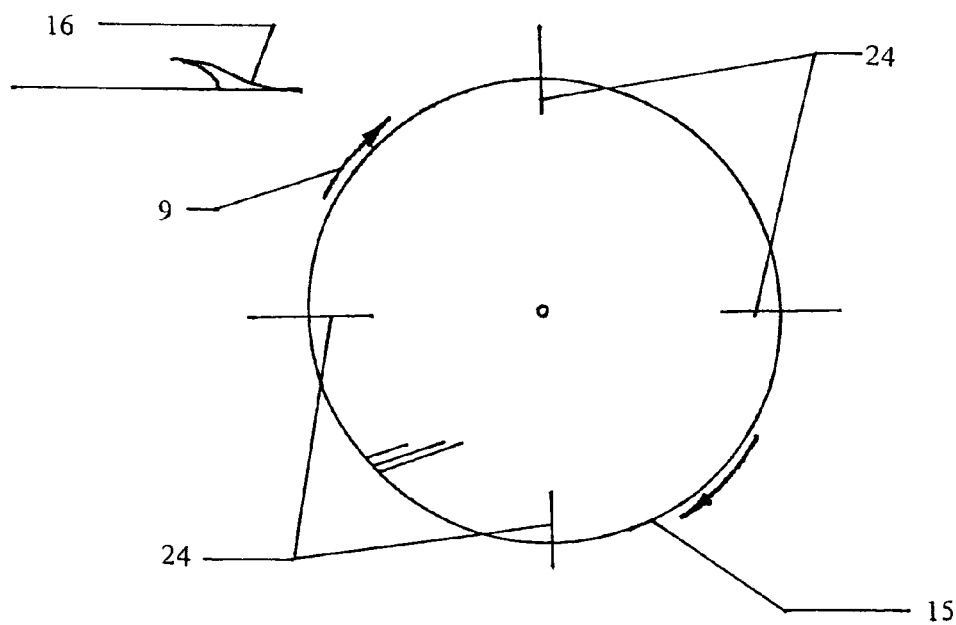
FIG. 6 advises of radial "clock" positions as relates to an end view of the rotating rotor and planned direction of rotation with a specified prevailing wind direction indicated.
Figure 7:
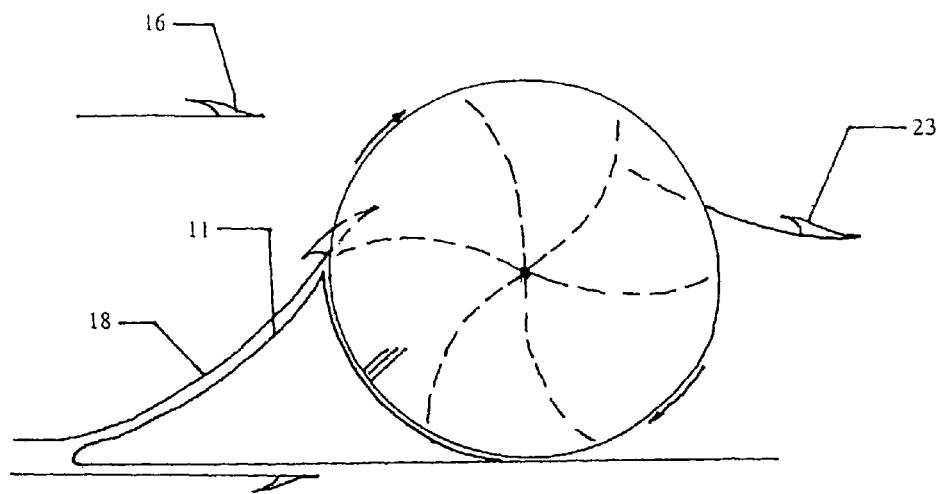
FIG. 7 is a cross-sectional view showing placement of the wind ramp airfoil and intended flow response of the prevailing wind.
Figure 8:
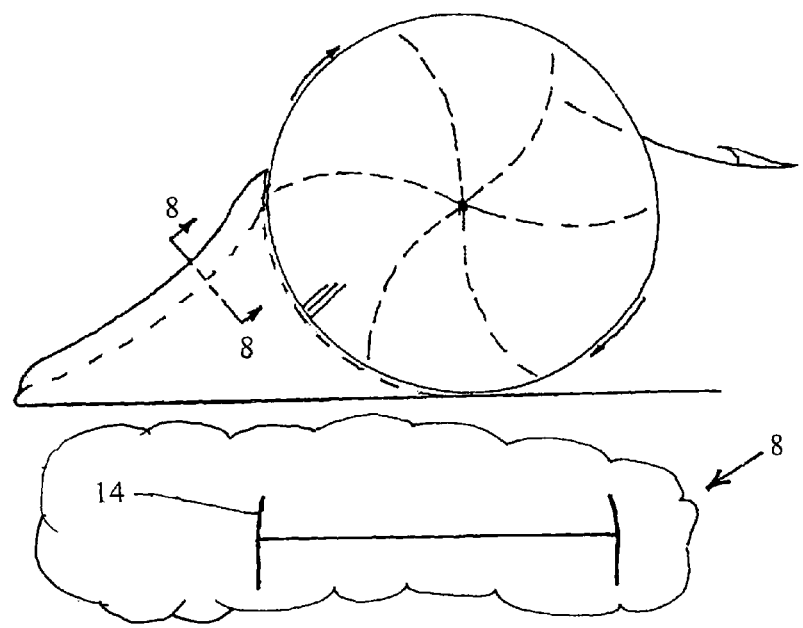
FIG. 8 is a cross-sectional view of a section of the wind ramp with line 8-8 FIG. 8 accompanying, to view the vertical anti-wind-spill ramp side baffles.

Spill Plates (Splates) FIG. 5 and FIG. 6

Splates 15 encloses both ends of the rotor bucket assembly 1 with two solid covers 15 to prevent captured compressed wind inside the turbine bucket 1 void to spill out from the sides of the rotor 1, thereby decreasing the effectiveness of the compression stroke.

CWE Concept Element #2, Wind Ramp

FIG. 5, FIG. 6. & FIG. 7

A Wind Ramp 11 is placed at the leading edge of the CWE Unit Chassis which blocks Wind Energy 18 from striking the rotating Rotor Bucket Blades 1 on the lower, upwind portion of the Rotor 1 and below the Rotor Axle 2 from the 6:00 to 9:00 o'clock positions. 24(See FIG. 6). That Wind Pressure is constantly diverted from the horizontal, up the wedge-shaped airfoil 11 into the rotating Rotor Turbine 1 at or above the elevation of the Rotor Axle 2. This allows that directed Wind Energy to flow up 18 into the arriving Bucket Voids 1 to assist rotational propulsion up to the maximum Compression Stroke area from 9:00-12:00 O'clock regime 24. The lateral edges of the Wind Ramp have vertical, curved Baffle Plates 14 on both sides that rise up with the curved Wind Ramp surface 11 and as those Plates 14 rise, they also curl inward slightly. This is to assist in retaining the flow of that portion of the oncoming Captured Wind 18 so that it does not easily spill out over the lateral side of the Ramp prior to injection into the Bucket voids 1. Configuration of the Wind Ramp 11 and Side Baffles 14 may be varied for maximum efficiency. (See FIGS. 7 and 8.) For explanation of the CWE operation concept, it will always be assumed that the Wind is blowing from the left to right 16 on the Drawing Pages (a few exceptions are where the CADD reverses positions for clarity). The front of the CWE is usually facing to the left of the page. The CWE concept claims that the Rotor Buckets are seen rotating in the clockwise direction 9. Reference FIG. 6, the top of the Rotor is at 12:00 with hour-hand designations of a circular clock 24 to be at 3:00 o'clock 90 degrees to the right, 6:00 is at the bottom and 9:00 is at the far-left clock position. Exhausted Wind 23 flows out of the 3:00 area.

CWE Concept Element #3

Figure 9:
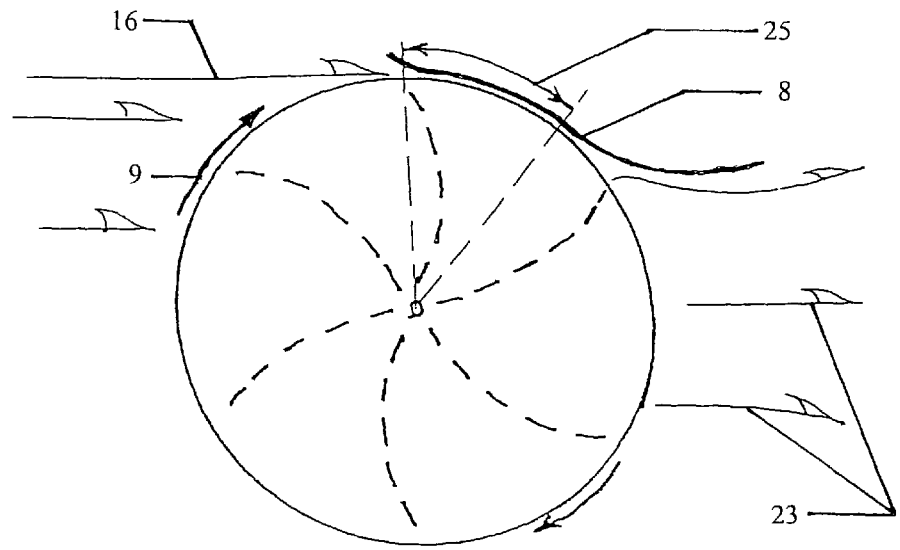
FIG. 9 is a cross-sectional view advising of the top wind-keeper cowling and intended flow response of the prevailing wind.
Figure 10:
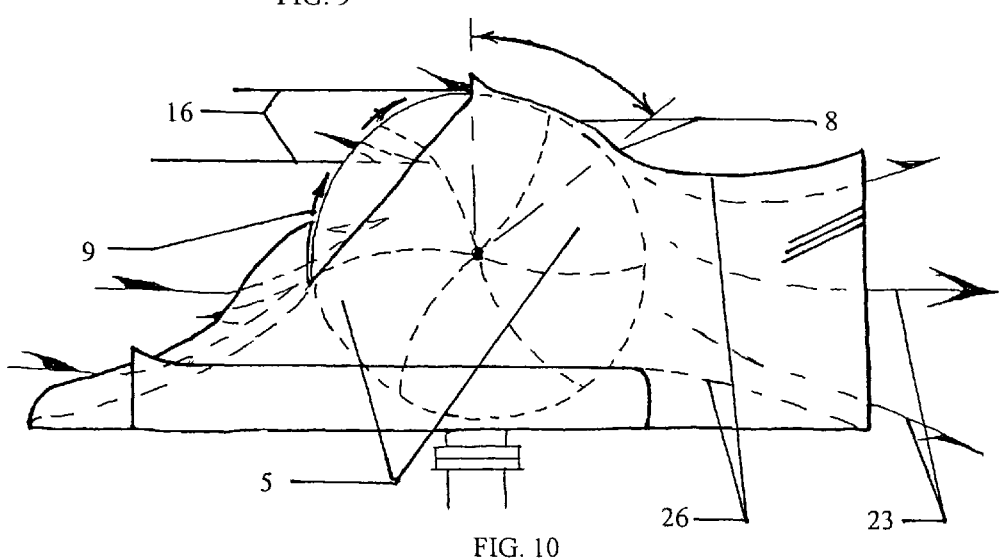
FIG. 10 is an elevation side-view of the main body chassis depicting the enclosure cowling of the device, it's relationship to the FIG. 9 wind-keeper cross-section and the intended flow response of the prevailing wind.

Wind Keeper Baffle (FIG. 9 & FIG. 10)

A Wind Keeper Baffle 8 is located across the top of the rotor with its leading edge at the 12:00 o'clock position and curves down the backside of the vertical axis of the rotating rotor assembly. It is supported by the side cowling rotor enclosure portion of the CWE chassis 5 and is curvature-shaped to fit close to the rotor bucket circumference of rotation 9. This design is to assist the end plate retention of compressed wind energy 16 sealed inside the bucket voids to an engineered design point of release to allow the used wind to exhaust downwind. That period of holding the wind flow from the 12 o'clock to the 1:30 position is designed to increase the efficiency of the CWE before allowing the used wind 23 to exhaust out of the bucket void. Just prior to at the calculated point of beginning to release 8, the keeper baffle 8 shape radius out downward and flares upward to a minor degree, to provide the top of the convergent/divergent Bernoulli-enhanced Venturi 26 exhaust portion of the CWE chassis 5.

CWE Concept Element #4

Chassis Cowling #4 (FIG. 1 & FIG. 2)

The underside of the CWE Chassis 5 is enclosed, extending from the leading edge of the wind ramp 11 common to the downwind end of the unit to the exhausted wind lip. The rotor 1 is enclosed on both sides from the rotor axle 2 down to the underside plate. The side cowling 5 sweeps up just aft of the axle 2 to tie into the horizontal keeper baffle assembly 8 atop the chassis 5. Incorporated into the wind flow sheet metal is the top flare of the keeper baffle 8 and a matching sweep with the underside plate to complete the effect of a Venturi effect design downwind to an exhaust wind outlet to assist in most efficiently drawing out of the used Wind. Materials and design may be varied to achieve desired results. (See FIG. 5).

CWE Concept Element #5

Wind Reversal Ducting Systems (WRDS) (FIG. 11 & FIG. 12)

Horizontal wind intake Ducts 6 are shown mounted on both sides of the outside Chassis enclosure 5, below the Rotor axle 2. They are open upwind to the prevailing wind flow 16. The purpose is to capture that portion of the wind energy 20 that is flowing past, just outside of the Wind Ramp airfoil. That captured wind 20 flows inside the horizontal ducts 6. The Duct tubes 6, either square or rectangular in shape, conduct that captured wind 20 internally to flow along the lower horizontal longitudinal alignment of the Chassis body 5. The Duct tubes 6 turn 90 degrees toward the centerline of the Chassis 5 behind and below the rotating Rotor 1. Internal fixed vanes 28 assist the captured wind 20 to turn in that 90 degree configuration, a standard HVAC ducting practice. The wind 20 then vane-turns 28 another 90 degrees to complete 180 degrees of turn, a "U"-turn of direction. The wind 20 is now being forced into an upwind direction inside the confined Rotor Cowling 5 space. The contained wind 20 is then vented into the rotating Bucket 1 voids as they continue past the "clock" positions where they just completed exhausting the used wind. This is designed to eliminate any back draft suction that would affect those Buckets 1 rotating up into the clear at the 9 o'clock position above the Wind Ramp lip. CWE WRDS 6 size, shape, internal vanes 28, intake flaring design, and internal Variable Air Volume (VAV) vanes 7 may be varied for eliminating back draft suction and control of excess wind speeds. WRDS Ducts 6 may also be placed along the bottom of the Chassis 5 for compactness of unit, with the desired Wind Reversal effect 20 and back draft elimination to be the same.

CWE Concept Element #6

Figure 13:
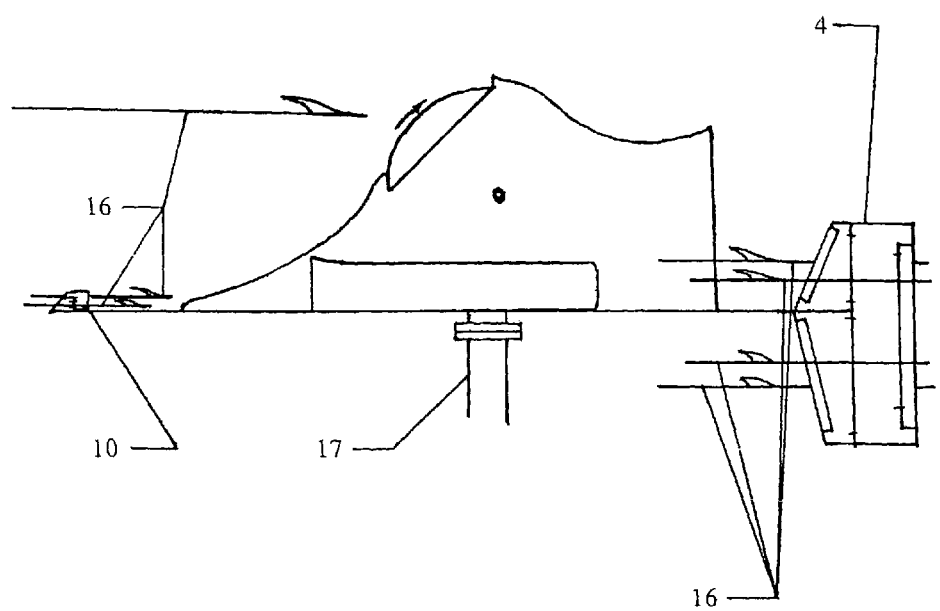
FIG. 13 is an elevation side-view of the entire device with weathervane swivel capabilities, comprising of the main body unit, gust detection servo-tabs and mounting booms, swivel-action tower mount, and the vertical fin & rudder with anti-servo tabs and intended flow response of the prevailing wind.

Servo Tabs and Rudder Weather Vane System FIG. 13

Small vertical fin/rudder tabs 10 mount vertically on an extension or dual rod extensions well out in front of the wind ramp leading edge to sample variations in the direction of the wind 16, such as gusts, as they approach the CWE unit. The tabs 10 work to maximize the effectiveness of the entire unit by for maintaining alignment with the wind 16 for maximum efficiency in wind capture. This is based on the premise that the unit body is balanced on a vertical shaft bearing 17 and is free to rotate about the azimuth. As the tabs 10 upwind find a wind change, cable rigging or sensors will transmit that information back to servo tabs mounted on a free swinging large rudder and vertical fin assembly 4 for assisting the rotor assembly to weather vane into the best wind condition 16 constantly. A simpler version of the weather vane feature could preclude the use of upwind tabs 10 and hinged rudders 4, and merely have large vertical fins mounted fixed on downwind extension pole supports for attaining relative wind orientation. Application of servo tabs 10 and rudder weather vane system 4 will be used on wind engines mounted to allow swivel and constant hunting for head winds 16. Some application that has fixed chassis mounts will not require this feature. Wind farms that have predicted wind direction will not require this system 4, 10. Design and configuration for CWE models are may be varied to achieve desired results.

CWE Concept Element #7

Figure 14:
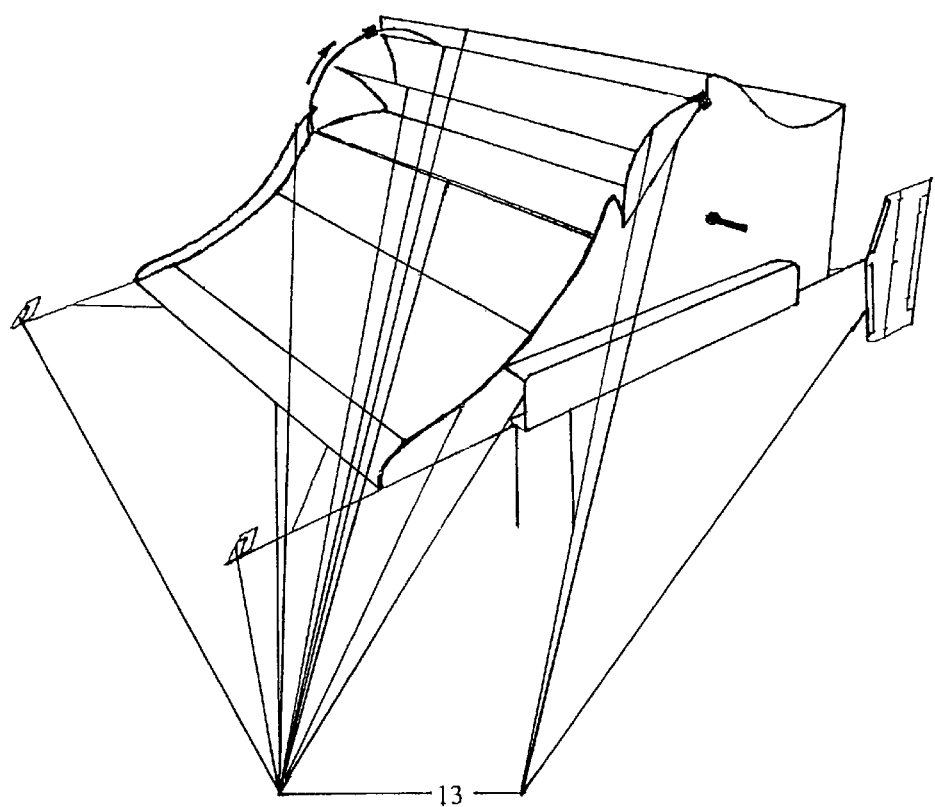
FIG. 14 is a quartering frontal isometric view depicting the various leading edges that will accommodate anti-icing elements in adverse weather climes.

Anti-Icing System FIG. 1, FIG. 2, and FIG. 14

The primary wind driven mechanical or electrical generating machinery attached to the PTO shaft 2 may also have an accessory drive case which can drive a small self-contained electrical source which, through electrical slip rings at the rotor axle 2 will power heated leading edges of the horizontal bucket blades 1 and the splates 15 outer circumference for anti-icing service (leading edge potential for icing depicted 13, FIG. 14). Rotor rotation 9 centrifugal force will fling any ice that forms out and away at the backside exhaust area, to be shed downwind. All inlets that are part of the fixed ducting may be fitted with embedded leading edge elements for heating to allow continued reliable operation in freezing weather. Anti-icing for those leading edges 13, the front of the wind ramp airfoil 11 and the top lip of the wind keeper baffle/cowling 8 could alternatively be supplied with pneumatic ice protection boots similar to those fitted on aircraft wings and fins leading edge surfaces. In addition, a small compressor may be driven at the accessory case to maintain compressed air in an accumulator tank built into the CWE chassis 5 for use in bad weather. Another ant-ice consideration could be to pump anti-ice fluid weep at the fixed leading edges, as used in aircraft technology innovation. All of these methods will be engineered to activate automatically upon ice buildup detection 13 and to ensure the CWE remains operation in icy weather. Anti-icing features will be installed only on models utilized on wind farms that are predicted to freeze during the winter months.

California Wind Engine Concept Element #8 & #9

Figure 15:
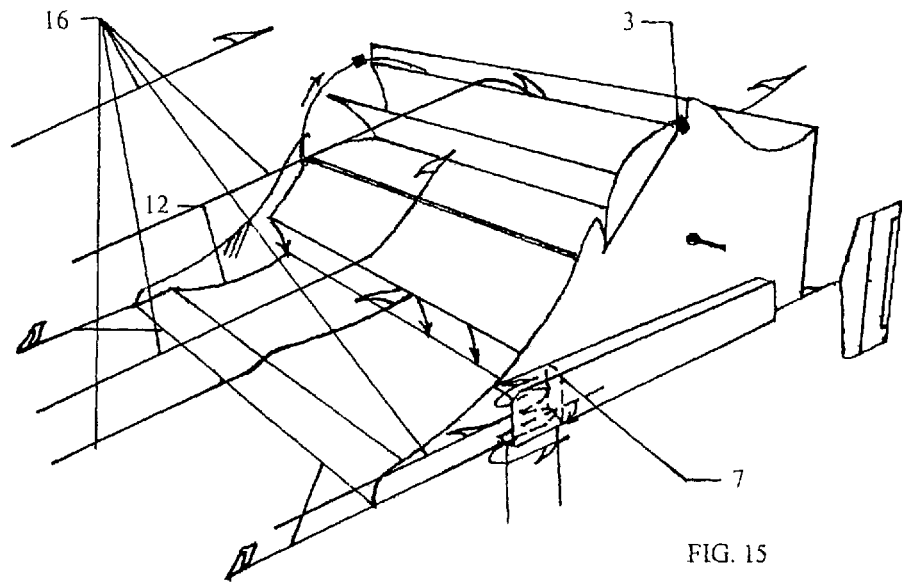
FIG. 15 is a quartering frontal isometric view depicting purposeful device efficiency-reducing features for controlling design rotation rpm speed through the use of the ramp wind dump panel (shown in high wind "dump" position) the wind reversal ducting system internal variable air volume vanes shown closed, and noting the placing of disc brake calipers, with the intended flow response of the prevailing wind through and around the unit chassis.
Figure 16:
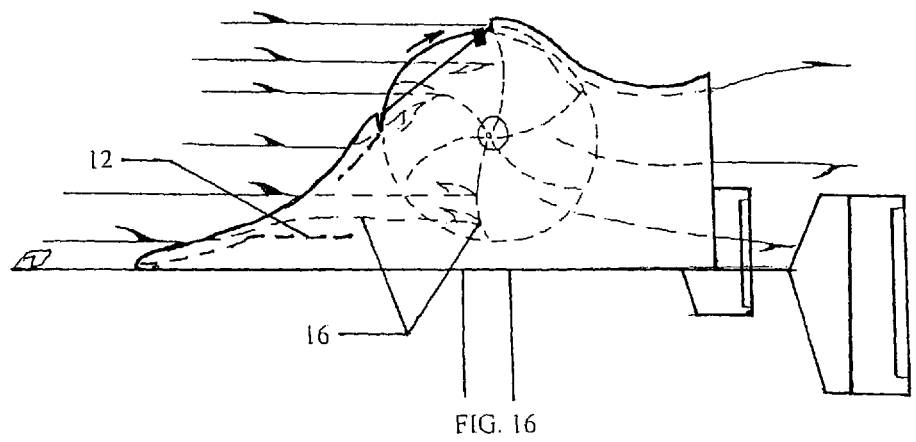
FIG. 16 is a cross-section view depicting the wind ramp dump panel in the high-wind and maintenance position with the intended flow response of the prevailing wind though the device.

Rotor Brake System/Ramp Rpm Limiter/Overspeed Governor FIG. 15 and FIG. 16

The CWE Rotor Braking System 3 will be utilized for maintenance, Rotor over-speeding, and emergencies. The CWE Ramp System 11, 12 to be built to allow the wind Ramp to rise or modify shape 12 to prevent prevailing wind 16 from striking the bucket voids 1, &/or retard the efficiency of the airfoil to reduce the driving force for rotating the Rotor. This action to be activated, controlled by a service technician. This process decreases the rotation speed of the CWE Rotor 1 assisting in slowing the Rotor to a complete stop. Wind Ramp 11 may be designed to move up into position to block the force of the wind at the Power Stroke sequence 16 of the Rotor above the Rotor Axle and at the same time expose an open area below the Axle level 12 providing means for the oncoming Wind Energy 16 to force against the lower, returning Bucket Blades 1, FIG. 16. Additionally, as part of the Braking System 3, the hinged VAV Vanes 7 in the WRDS linear outside ducts 6 will operate to closed position, thereby preventing Wind Energy flow 16 from entering the WRDS duct 6, aiding in the braking process. Once all rotation has come to a safe and complete stop, conventional fail-safe braking assemblies with the use of automotive style calipers and brake pads 3 binding against the Spill Plate 15 outer circumferences hold the CWE Rotor 1 stabilized, stationary for servicing. Specifics of the mechanical design are may be varied to achieve desired results. Also, prevention and control of high-wind-condition Rotor over-speed will utilize these systems automatically, controlled by the Over-Speed Governor for safety and structural consideration (not seen in Drawings).

General Construction Expectations & Comments

Physical dimensions, shapes and materials of the CWE Elements may be varied with engineering and design teams based at various wind farms and to include end user's needs and geographical locations.

1. Specific considerations will include:
  (A) Best ratio of rotor diameter- to rotor chassis, body and width.
  (B) Wind ramp length, airfoil shape, and degree of approaching wind direction change within the ramp's area of influence, from horizontal to upward, toward the vertical.
  (C) Venturi effect design and number of degrees of rotation of opening to downwind for used wind exhausting and "clock position" to flare past 12 o'clock top-dead center.
  (D) Size, length and shape of the Wind Reversal Ducting System.
  (E) Size, shape and position of the rudder and weather vane fin(s) downwind and upwind directional sensor servo tabs as applicable may all be varied for most efficient design 2. All materials to be incorporated into the structure of the CWE units may be varied to achieve desired results. Design lubrication systems and chassis unit pivot axle when required may be included.

3. Existing Standard Material Engineering and Conventional Construction Means and Methods are to be incorporated into the unique design concepts as contained herein. Unit chassis and body, rotor bearings, monopoles or other types of towers, building mount conditions, PTO shafts, spline or key designs, types of generator or other machinery to be driven such as electrical power production, transfer of the power or product generated to get down to the user interface at the base of the tower or building is understood to be of conventional mechanical, electrical and structural means.

4. The single-barrel horizontal placement of the rotor turbine described herein is used for an example. That horizontal placement and the described six each rotor buckets are not a part of this patent, only the nine concept elements are for efficiency enhancement described herein of such rotor installations. The assumption is the power stroke is from 9 o'clock through to the top of the assembly with the rotor bucket at the top 12 o'clock and past to the engineered number of degrees rotation where used wind begins exhausting downwind in these example descriptions. At the 6 o'clock position, the bucket blades are rotating upwind and forward wind resistance is blocked and deflected upward positively by the shaping of the wind ramp airfoil.

5. The CWE Design Concepts are for providing powerful and efficient delivery of the prevailing renewable wind energy down to the ends of the two PTO shafts with high torque values to be applied for useful work. That is the purpose of the present invention.

Civil Urban Planning Departments, and Other Items

1. The CWE overall concept has major green renewable wind energy capture for useful work uppermost in mind and the CWE "S" Rotor is much more environmentally friendly compared to many other wind capture designs already in place with regard to indigenous bird and nature populations in such assemble wind farms and building installations.

2. Urban and rural planning departments should have a much easier task in reviewing and approving considerations for satisfying the general publics' need and aesthetic desires with the CWE Design. The CWE units will be offered in a variety of exterior finishes. The exterior fixed-type surfaces can be offered with painted murals, such as bluish skies with background white puffy cumulus cloud overlays for example, for pleasant eye appeal.

3. Continuing the theme concerning urban planning departments, a large percentage of the CWE rotating-power-producing machinery (the turbine bucket assembly) is concealed behind the fixed chassis design ducting and cowling enclosures. For those units which are designed with the Omni Azimuth directional swiveling feature, that movement around the pivot axle will be no more noticeable to the public than natural weather changes of wind direction. Man sizes of the CWE are to be offered on the market. Large public utility wind farm units can be customized for the various quantities of winds extant at those diverse locations along with the de-icing/anti-icing options, and the Omni directional option, as needed.

4. The CWE design lends itself to the possibility of mass production for resulting economies of scale similar to HVAC air handler fan units and similar units that are manufactured for building construction in urban areas for example. HVAC Direct Drive need could be driven directly by one of the rotor PTO shafts. Farm units in the Plains States, might be more utilitarian in appearance. The PTO shafts available at both ends of the wind rotor axle may be used to mount an air compressor on one end to supply compressed air to operate pneumatic tools for maintenance operations. The other end may be fitted for an electrical generator to provide stored electrical energy through rectifiers into a battery bank and shared electrical energy aiding in incoming public utility electric meter power. This will be a consideration for farm and rural use in particular. Multi-purpose and quiet, utility with reliability.

5. Rural tornado-prone areas might have a tower feature that would allow the unit to "kneel" to the ground, or retract downward telescopically upon manual or automatic command, if such a storm threat appears.

California Wind Engine Siting Placement Examples

FIG. 17, FIG. 18 & FIG. 19

Figure 17:
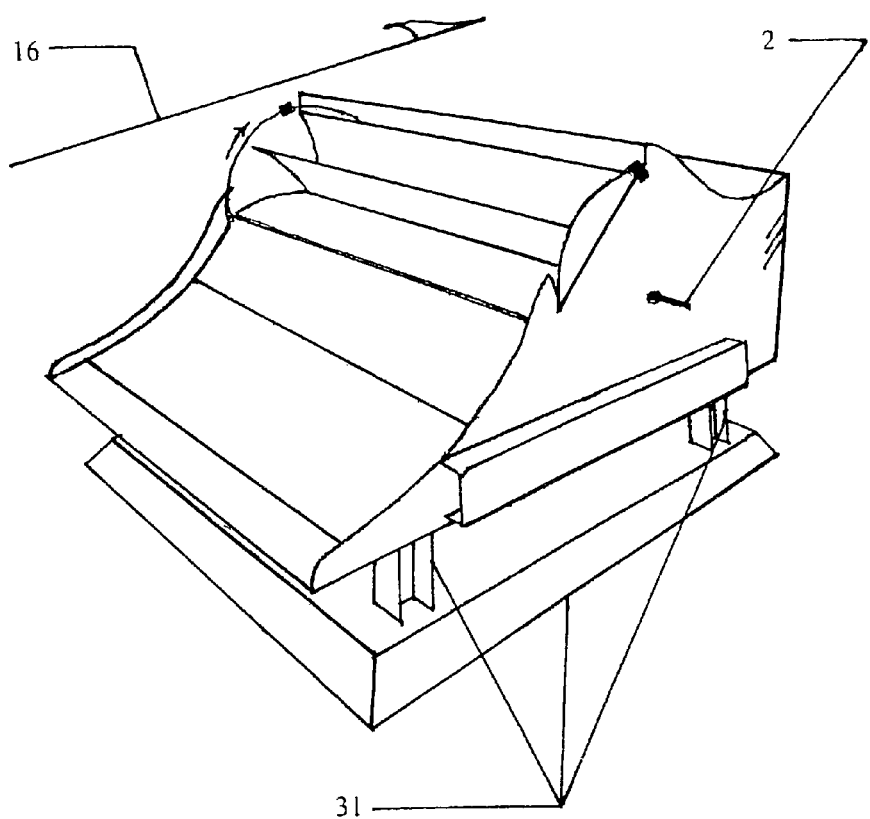
FIG. 17 is a frontal quartering isometric view of the device as mounted on a fixed heading in remote areas of unchanging wind direction quality. No weathervane appurtenances required.

FIG. 17 depicts a large low-mount wind farm installation frontal quarter isometric view of the unit as placed in areas where quality of the wind direction remains fairly constant. No weather-van rudder system required in this fixed-heading installation. Preferred prevailing wind 16 noted. Unit is mounted on a bolt-down structural frame and pad 31. One of the two power takeoff shafts 2 is depicted, while end-user machinery such as generators are not, for this illustration.

Figure 18:
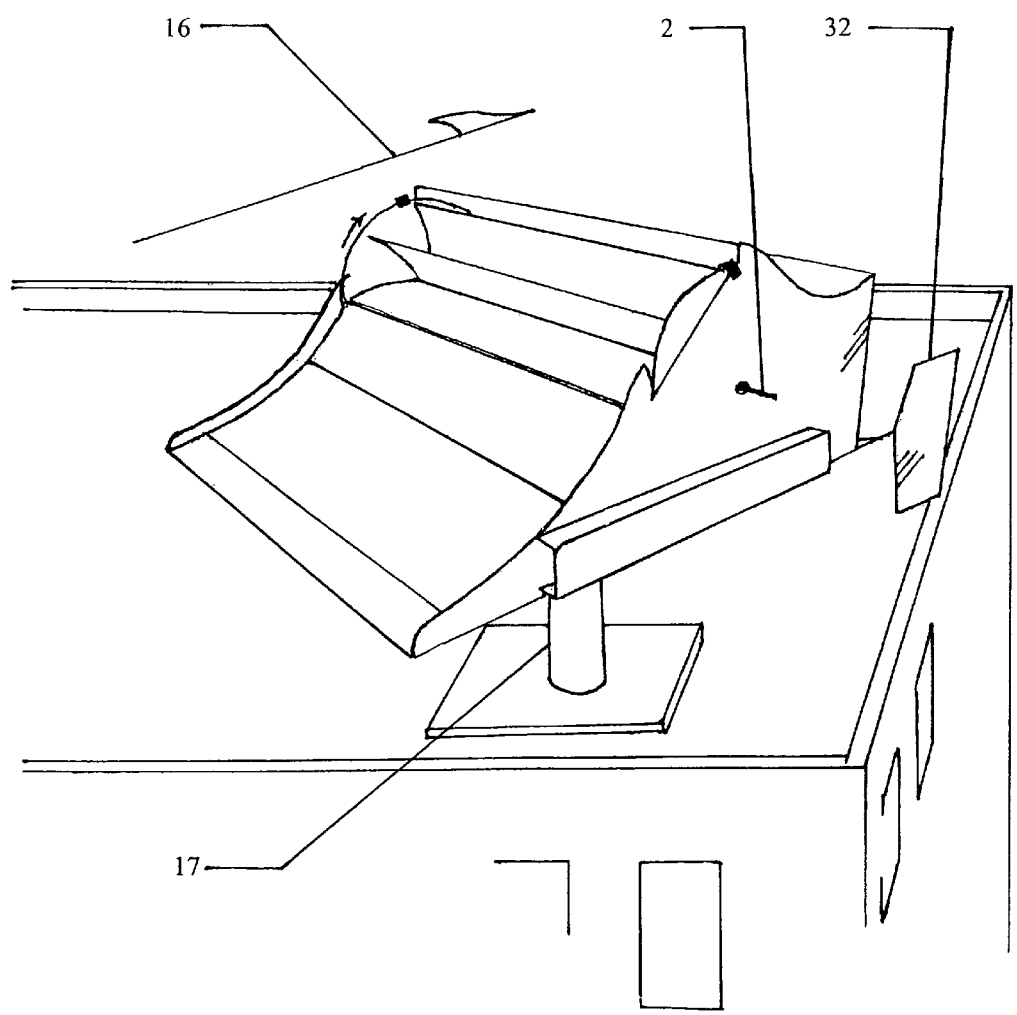
FIG. 18 is a frontal quartering isometric view of the device as mounted on high-rise and commercial buildings with weathervane swivel capability. Fixed downwind vertical fins apply in this FIG. 18.
Figure 19:
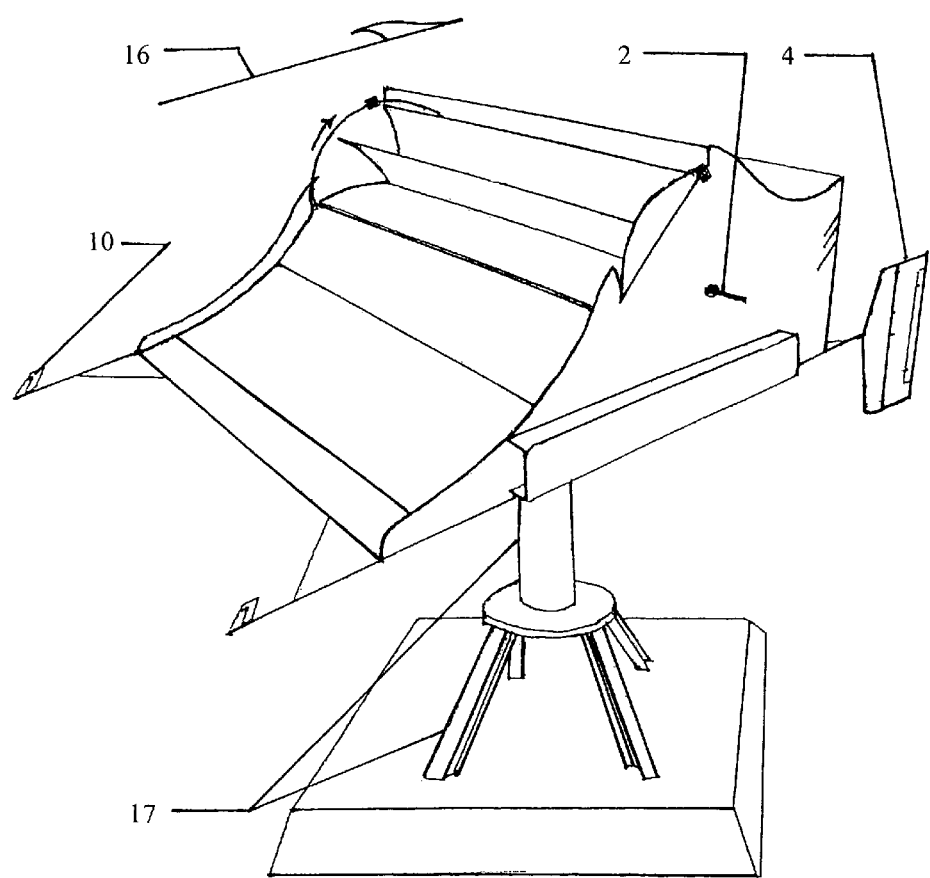
FIG. 19 is a frontal quartering isometric view of the device with full weathervane detection and swivel capabilities as mounted on a low-rise tower.

FIG. 18 depicts a moderate-size frontal quarter isometric view of the unit placed on a chassis swivel-mount pole 17 as a high-rise or commercial building wind power energy augmentation installation with weathervane capabilities through the use of downwind vertical fins 32 versus the more complex gust servo-tabs and hinged rudder system shown 4, 10 on FIG. 19. One of the two power takeoff shafts 2 is depicted, while end-user machinery such as generators are not, for this illustration.

FIG. 19 depicts a frontal quarter isometric view a large low-to-medium height tower-mount 17 unit with all the sensing and drive capabilities described heretofore for the present invention, with 360 degree swivel capability incorporated in this wind farm depiction, including gust detection tabs 10 and fin/rudder 4 with servo-tab incorporated. One of the tow power takeoff shafts 2 is depicted, while end-user machinery such as generators are not, for this illustration.

The present invention relates to the capture of renewable energy from the power of wind, to provide a new means of improved energy extraction from given volumes and velocities of wind. This for providing great overall improvements in environmental and public acceptance of such installations while greatly reducing hazards of indigenous wildlife populations. Through the use of several concepts of specially designed baffles, cowling enclosures and other aerodynamic features, the invention will greatly improve the reliability and robust nature of "S" Rotor-type power plant driving mechanisms. The end result is for providing two high-torque power take-off shafts for each Unit, for industry and electrical utility companies to adapt their end-user machinery to, for producing useful work, in many and varied markets, and ways. The inventive wind turbine unit will do this by incorporating the following major improvements to existing designs. Spill plates at the ends of the rotor assembly, which prevent wind pressure from leaking out of the end gaps of the rotor bucket voids when under load. A wind ramp, which diverts upwind resistance to rotation of the rotor and adjusts the wind flow direction, so as to positively enhance rotor rotation. A windkeeper cowling baffle that sits across the top of the rotor assembly to retain wind pressure an engineered number of degrees past top dead center of the rotor assembly. A cowling enclosing the rotor chassis and including internal baffles for downwind exhaust. A wind reversal ducting system that assists in eliminating upwind resistance and back-draft drag on the upwind portion of the rotor assembly through rotation around 360 degrees of its circumference. A weather vane system having downwind fins and rudders, coupled with upwind gust sensor servo-tabs that drive the rudders in wind-direction shifts to continuously find the best wind direction most efficiently and quickly. Aircraft-style anti-icing features may be installed at inclement weather locations for reliability reasons. Wind ramp "efficiency dump panels" and variable air volume (VAV) vanes inside the wind reversal ducts are installed to prevent rotor rotation over-speed (structural integrity and safety considerations), which will operate automatically in normal service, and can be manually controlled by technicians for maintenance purposes. A governor system may be incorporated on end-user machinery accessory cases for controlling the VAV Vanes and wind ramp efficiency dump panels.

A variety of modifications and improvements to the present disclosure will be apparent to those skilled in the art. Accordingly, those skilled in the art will appreciate that such changes may be made without departing from the underlying principles of the present disclosure. The above-described disclosure is not intended to limit the scope of the invention. Accordingly, the scope of the present invention is determined only by the following claims.

What is claimed is:

1. A wind turbine unit having an upwind side and a downwind side, the wind turbine unit comprising:
   a single- or multi-barrel elongated rotor assembly a rotor axle fixedly passing through an axis of rotation and spill slates enclosing each end of the rotor assembly, the rotor assembly disposed in the wind turbine unit such that its axis of rotation is generally perpendicular to a direction of wind flow from the upwind side of the downwind side;
   a wedge-shaped wind ramp disposed on the upwind side of the wind turbine unit, the wind ramp having a curved, inclined surface extending from a leading edge at a point approximately even with a bottom of the rotor assembly to a trailing edge approximately adjacent to a front of the rotor assembly, wherein the curved. inclined surface covers a lower, upwind portion of the rotor assembly and wherein the trailing edge of the wind ramp is adjustable relative to the front of the rotor assembly, such that the curved, inclined surface may also cover a part of an upper, upwind portion of the rotor assembly;
   an outlet cowling enclosure disposed on the downwind side of the wind turbine unit, wherein the outlet cowling enclosure has a convergent entrance and a divergent exit;
   a cowling baffle disposed on the downwind side of the wind turbine unit, the cowling baffle having a curved, declined surface extending from a front edge at a point approximately adjacent to a top midpoint of the rotor assembly to a back edge integral with a top surface of the convergent portion of the outlet cowling enclosure, wherein the curved, declined surface covers an upper, downwind portion of the rotor assembly; and
   a weather vane system having rudders mounted on downwind booms extending from the downwind side of the wind turbine unit, wherein the rudders are configured so as to rotate the wind turbine unit about a vertical axis of the base in response to a change in the direction of wind flow, wherein the weather vane system further comprises servo-tabs mounted on the upwind side of the wind turbine unit, wherein the servo-tabs are configured to sense the direction of wind flow and adjust an orientation of the rudders in response to the sensed direction of wind flow.

2. The wind turbine unit of claim 1, further comprising a wind reversal ducting system having a linear duct connected to an internal reversing duct, the linear duct disposed on an outside of the wind turbine unit and having an inlet oriented toward the upwind side of the wind turbine unit, the internal reversing duct disposed generally below a bottom surface of the convergent portion of the outlet cowling enclosure.

3. The wind turbine unit of claim 2, wherein the internal reversing duct is configured so as to redirect the direction of wind flow passing through the inlet of the linear duct, such that the direction of wind flow impacts on a lower, downwind portion of the rotor assembly.

4. The wind turbine unit of claim 3, further comprising an adjustable baffle in the internal reversing duct configured so as to redirect the direction of wind flow passing through the inlet of the linear duct, such that the direction of the wind flow impacts generally on the lower, upwind portion of the rotor assembly.

5. The wind turbine unit of claim 1, wherein at least one end of the rotor axle is connected to a motor or generator.

6. The wind turbine unit of claim 1, wherein the outlet cowling enclosure spans approximately sixty degrees of rotation of the downwind side of the rotor assembly.

7. The wind turbine unit of claim 1, wherein the wind turbine unit is mounted on a base, such that the wind turbine unit is generally freely rotating about a vertical axis of the base.

8. The wind turbine unit of claim 1, wherein the servo-tabs are mounted on upwind booms extending from the upwind side of the wind turbine unit.

9. A wind turbine unit having an upwind side and a downwind side, the wind turbine unit comprising:
   a single- or multi-barrel, elongated rotor assembly having a rotor axle fixedly passing through an axis of rotation and spill plates enclosing each end of the rotor assembly. the rotor assembly disposed in the wind turbine unit such that its axis of rotation is generally perpendicular to a direction of wind flow from the upwind side to the downwind side;
   a wedge-shaped wind ramp disposed on the upwind side of the wind turbine Unit, the wind ramp having a curved inclined surface extending from a leading Edge at a point a approximately even with a bottom of the rotor assembly to a trailing edge approximately adjacent to a front of the rotor assembly, wherein the curved, inclined surface covers a lower, upwind portion of the rotor assembly and wherein the trailing edge of the wind ramp is adjustable relative to the front of the rotor assembly, such that the curved, inclined surface may also cover a part of an upper, upwind portion of the rotor assembly;

an outlet cowling enclosure disposed on the downwind side of the wind turbine unit, wherein the outlet cowling enclosure has a convergent entrance and a divergent exit;

a cowling baffle disposed on the downwind side of the wind turbine unit, the cowling baffle having a curved, declined surface extending from a front edge at a point approximately adjacent to a top midpoint of the rotor assembly to a back edge integral with a top surface of the convergent portion of the outlet cowling enclosure, wherein the curved, declined surface covers an upper, downwind portion of the rotor assembly; and an anti-icing system having an accessory generator attached to the rotor axle and electrically connected to heating elements mounted in the rotor assembly.

10. The wind turbine unit of claim 9, further comprising secondary heating elements electrically connected to the accessory generator and mounted on the leading edge of the wind ramp and the front edge of the cowling baffle.

* * * * *